United States Patent
Sreedharan et al.

(10) Patent No.: US 9,306,968 B2
(45) Date of Patent: *Apr. 5, 2016

(54) SYSTEMS AND METHODS FOR RISK RATING AND PRO-ACTIVELY DETECTING MALICIOUS ONLINE ADS

(71) Applicant: McAfee, Inc., Santa Clara, CA (US)

(72) Inventors: Jayesh Sreedharan, Bangalore (IN); Rahul Mohandas, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,620

(22) Filed: Jul. 30, 2014

(65) Prior Publication Data

US 2014/0344928 A1    Nov. 20, 2014

Related U.S. Application Data

(63) Continuation of application No. 12/717,320, filed on Mar. 4, 2010, now Pat. No. 8,813,232.

(51) Int. Cl.
*H04L 29/06* (2006.01)
*G06F 21/56* (2013.01)
*G06F 21/00* (2013.01)
(Continued)

(52) U.S. Cl.
CPC ............ *H04L 63/1433* (2013.01); *G06F 21/00* (2013.01); *G06F 21/566* (2013.01); *G06F 21/577* (2013.01); *H04L 63/1466* (2013.01); *G06F 3/14* (2013.01); *G06F 2221/2119* (2013.01); *G06Q 30/0277* (2013.01)

(58) Field of Classification Search
CPC ............ H04L 63/1433; H04L 63/1466; H04L 63/1441; G06F 21/577; G06F 21/57; G06F 21/566; G06F 51/56; G06F 2221/2119; G06F 2221/2125; G06Q 30/0277
USPC ............... 726/22, 23, 25; 713/187; 705/14.73
See application file for complete search history.

(56) References Cited

U.S. PATENT DOCUMENTS 5,983,348 A    11/1999 Ji
6,272,641 B1    8/2001 Ji
(Continued)

OTHER PUBLICATIONS

"Flash and other rich media files", Google webmaster central, 2010, 3 pages. Retrived from: https://support.google.com/webmasters/answer/72746?hl=en.

(Continued)

*Primary Examiner* — Zachary A Davis
(74) *Attorney, Agent, or Firm* — Blank Rome LLP

(57) ABSTRACT

Methods and systems for risk rating and pro-actively detecting malicious online ads are described. In one example embodiment, a system for risk rating and pro-actively detecting malicious online ads includes an extraction module, an analysis engine, and a filter module. The extraction module is configured to extract a SWF file from a web page downloaded by the system. The analysis engine is communicatively coupled to the extraction module. The analysis engine is configured to determine a risk rating for the SWF file and send the risk rating to a web application for display. In an example, determining the risk rating includes locating an embedded redirection URL and determining a risk rating for the embedded redirection URL. The filter module is configured to determine, based on the risk rating, whether to block the SWF file and send a warning to the web application for display.

25 Claims, 12 Drawing Sheets

(51) Int. Cl.
*G06F 21/57* (2013.01)
*G06F 3/14* (2006.01)
*G06Q 30/02* (2012.01)

(56) References Cited

U.S. PATENT DOCUMENTS

| | | | |
|---|---|---|---|
| 6,789,201 B2 * | 9/2004 | Barton et al. | 726/24 |
| 6,804,780 B1 | 10/2004 | Touboul | |
| 7,058,822 B2 | 6/2006 | Edery et al. | |
| 7,360,249 B1 * | 4/2008 | Szor et al. | 726/22 |
| 7,610,375 B2 | 10/2009 | Portolani et al. | |
| 7,613,926 B2 | 11/2009 | Edery et al. | |
| 7,624,436 B2 | 11/2009 | Balakrishnan et al. | |
| 7,681,235 B2 | 3/2010 | Chesla et al. | |
| 7,765,481 B2 * | 7/2010 | Dixon et al. | 715/738 |
| 7,873,635 B2 * | 1/2011 | Wang et al. | 707/735 |
| 7,971,137 B2 * | 6/2011 | Jindal et al. | 715/234 |
| 8,151,109 B2 * | 4/2012 | Fanton et al. | 713/165 |
| 8,180,891 B1 * | 5/2012 | Harrison | 709/224 |
| 8,220,062 B1 * | 7/2012 | Arankalle et al. | 726/27 |
| 8,281,401 B2 * | 10/2012 | Pennington et al. | 726/25 |
| 8,291,065 B2 * | 10/2012 | Goodman et al. | 709/224 |
| 8,510,829 B2 | 8/2013 | Mohandas et al. | |
| 8,732,839 B2 * | 5/2014 | Hohl | 726/25 |
| 8,813,232 B2 * | 8/2014 | Sreedharan et al. | 726/25 |
| 2005/0050222 A1 | 3/2005 | Packer | |
| 2006/0253584 A1 | 11/2006 | Dixon et al. | |
| 2008/0010368 A1 | 1/2008 | Hubbard et al. | |
| 2008/0133540 A1 | 6/2008 | Hubbard et al. | |
| 2008/0208868 A1 | 8/2008 | Hubbard | |
| 2008/0263659 A1 * | 10/2008 | Alme | 726/22 |
| 2009/0013408 A1 | 1/2009 | Schipka | |
| 2009/0106202 A1 * | 4/2009 | Mizrahi | 707/3 |
| 2010/0042931 A1 | 2/2010 | Dixon et al. | |
| 2010/0094860 A1 * | 4/2010 | Lin et al. | 707/709 |
| 2010/0125911 A1 * | 5/2010 | Bhaskaran | 726/23 |
| 2010/0257610 A1 | 10/2010 | Hohl | |
| 2011/0145926 A1 | 6/2011 | Dalcher et al. | |
| 2011/0191849 A1 * | 8/2011 | Jayaraman et al. | 726/23 |
| 2011/0219450 A1 | 9/2011 | McDougal et al. | |

OTHER PUBLICATIONS

Dowd, Mark, "Application-Specific Attacks: Leveraging the ActionScript Virtual Machine", IBM Global Technology Services, Apr. 2008, 26 pages.
Ferrer Methusela C., "Summary of ASF file specification", Aug. 21, 2008, 13 pages. Retrieved from: http://ithreats.net/2008/08/21/summary-of-asf-file-specification/.
Fukami, "SWF and the Malware Tragedy", Hide and Seek in a Flash, Dec. 13, 2008, 5 pages. Retrieved from: http://events.ccc.de/congress/2008/Fahrplan/attachments/1201_flashsec2.pdf.
McAfee, "From Zero-day to Real-time", McAfee, 2008, 9 pages. Retrieved from: http://www.northgate.com.ph/imgs/news/mcafee_aretemis_technology_090508t.pdf.
Final Office Action received for U.S. Appl. No. 12/717,320, mailed on Feb. 27, 2013, 20 pages.
Non-Final Office Action received for U.S. Appl. No. 12/717,320, mailed on Jul. 20, 2012, 16 pages.
Notice of Allowance received for U.S. Appl. No. 12/717,320, mailed on Apr. 25, 2014, 8 pages.
Final Office Action received for U.S. Appl. No. 12/717,320, mailed on Apr. 10, 2013, 13 pages.
Non-Final Office Action received for U.S. Appl. No. 12/822,856, mailed on Sep. 18, 2012, 25 pages.
Notice of Allowance received for U.S. Appl. No. 12/822,856, mailed on Apr. 19, 2013, 11 pages.
Final Office Action received for U.S. Appl. No. 12/822,856, mailed on Feb. 4, 2013, 28 pages.

* cited by examiner

SYSTEMS AND METHODS FOR RISK RATING AND PRO-ACTIVELY DETECTING MALICIOUS ONLINE ADS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, McAfee, Inc. All Rights Reserved.

TECHNICAL FIELD

Various embodiments relate generally to the field of computer security, and in particular, but not by way of limitation, to systems and methods for risk rating and detecting malicious online ads.

BACKGROUND ART

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

Another result of the increased access to the Internet is a rapid rise in reading news, shopping, and even watching television programs online. The rapid rise in online media consumption has fuelled an equally rapid increase in the amount and sophistication of online advertising. Online advertising started with simple banner ads or other types of static displays within a web page. As advertisers have looked for mechanisms to make online advertisements more eye-catching, animation products such as Adobe® Flash® (from Adobe Systems Inc. of San Jose, Calif.) have become more and more popular for delivering advertising content (in the form of a small web format (SWF) file). Flash® can provide advertisers a mechanism to present animation and even interactive advertisements embedded within standard web pages. However, with ever increasing sophistication comes an ever increasing potential for hackers to exploit security holes to deliver malware or take control of a user's system.

An increasing use of advertisements for malicious purposes presents a need for a system and method to pro-actively monitor, detect and filter potentially malicious online advertisements before a user can inadvertently fall prey to an attack.

BRIEF DESCRIPTION OF DRAWINGS

Some embodiments are illustrated by way of example and not limitation in the figures of the accompanying drawings in which:

FIG. 9 depicts some example ActionScript code from a SWF file.

FIG. 10 is a section of a SWF file illustrating an example malformed tag.

FIG. 11 is a code listing including examples of malicious scripts from a SWF file.

DESCRIPTION OF EMBODIMENTS

Figure 1:
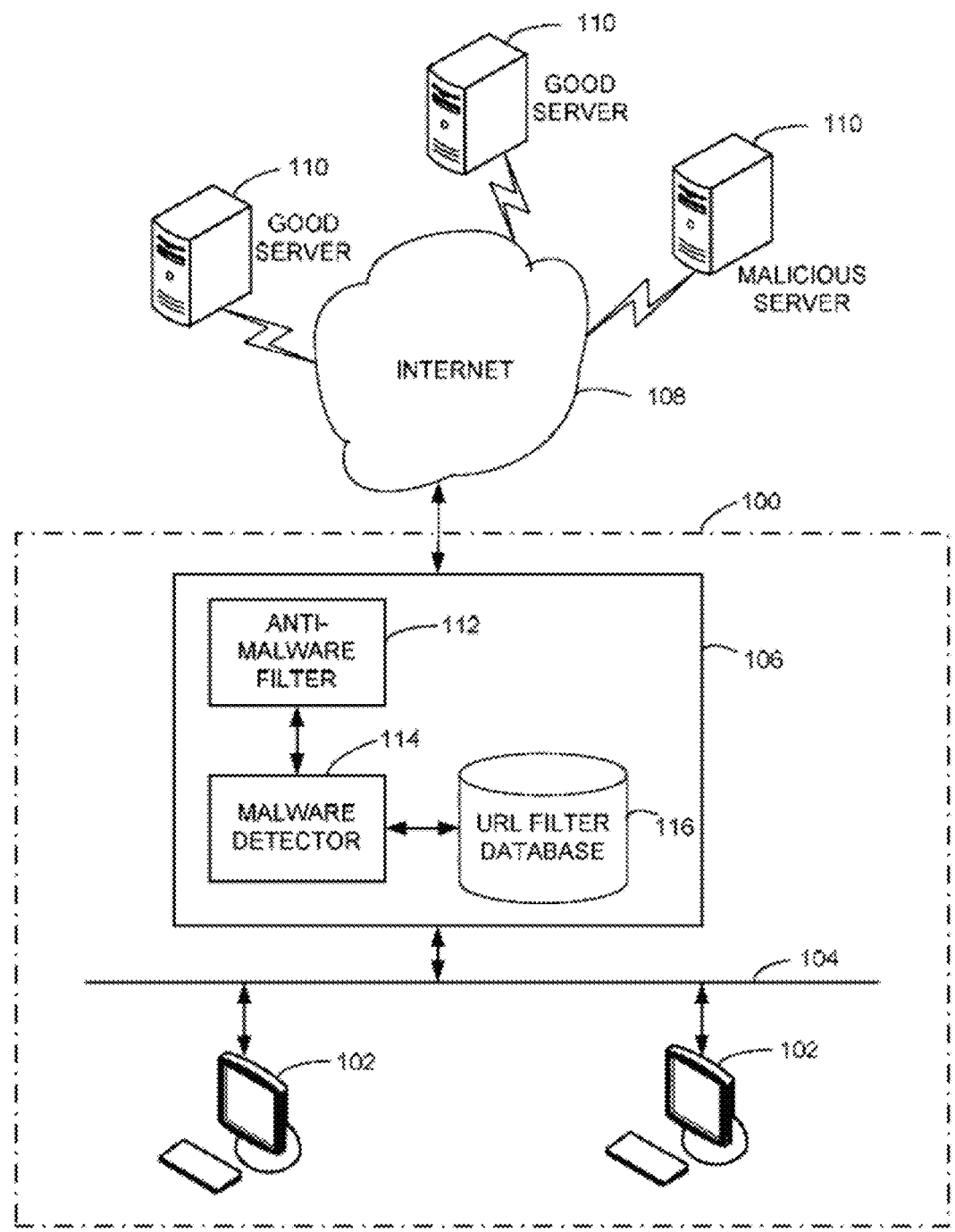
FIG. 1 is a block diagram that depicts an example system for detecting potential malicious mobile code in order to enhance Internet security.

Disclosed herein are various embodiments (e.g., examples) of the present invention for providing methods and systems for risk rating and pro-actively detecting malicious online advertisements. Risk rating online advertisements can provide a dynamic mechanism for protecting end-user systems from both known and unknown malicious online advertisements delivered via Adobe® Flash® (hereinafter "Flash") or similar animation/interactive advertisement platforms.

Individuals browsing the Internet are increasingly presented with interactive Flash advertisements enticing the unsuspecting user to click or otherwise interact with the ad. Interacting with online advertisement can often result in downloading some form of "malware" or "adware" onto a user's system, which can then proceed to steal valuable information or corrupt the user's system. Online cyber-criminals are continually coming up with innovative mechanisms to trick unsuspecting users by infecting legitimate websites with malicious Flash advertisements. Most modern threat detection engines used by anti-virus or anti-spyware programs rely on static URL submissions from various sources to detect potentially malicious behavior. This means that many attacks go undetected or remain viable for long periods before being added to the detection engine's database.

An example exploit using malicious Flash advertisements is called Flash Redirectors. Flash redirection attack redirects a user to a malicious website instead of where the advertisement is purporting to bring the user. A Flash redirection attack can be result in drive-by-download of malicious software code or some form of social engineering attack, such as prompting the user to install fake anti-virus software. In an example, Flash redirection attack the Flash Ad will often be hosted on an Ad Server, which is unaware of a uniform resource locator (URL) redirection embedded in the Flash Ad being served up to a user. The Ad Server, through the malicious Flash Ad, is connected to a malicious host. When the user clicks on the malicious Flash Ad the user is redirected to the malicious host by the embedded URL.

Another type of Flash based exploit is called Flash Sockets. Newer version of the Flash Player (the piece of code within a web browser that interprets Flash content) contains a Socket class. The Socket class enables ActionScript (see definition section below) code to make a socket connection and to read and write raw binary data. The Socket class is useful for working with servers that use binary protocols. However, the Socket class can be exploited by online cyber-criminals to connect a user's machine into a botnet. A "botnet" is a group of compromised computers remotely controlled typically for nefarious purposes, such as denial of service attacks, distributing e-mail spam, or distribution of Adware or Spyware programs.

Yet another type of Flash based exploit is called Clipboard Jacking. Clipboard Jacking uses booby-trapped Flash banner ads to hijack clipboards for use in rogue security software attacks (e.g., System.setClipboard (www.badsite.com)). Hackers can use this function to set the clipboard to a malicious website URL, so that whenever a user tries to copy and paste a line of text, the malicious URL will be pasted instead.

The final example type of Flash based exploit is called Cross-Site Scripting (XSS). XSS is an attack on users of a web application, such as salesforce.com (from Salesforce.com Inc. San Francisco, Calif., please note salesforce.com is merely being presented as an example web application; it is unknown whether salesforce.com has the vulnerability being described here). If a web application is vulnerable to XSS, and an attacker lures a user of the vulnerable web application to click on a malicious link, the attacker can gain complete control of the user's session within the web application. Once in control, the attacker can use JavaScript™ to perform any action on behalf of the user.

The exploits described above are just a few of the Flash based advertising exploits discovered recently. The following systems and methods are presented as a mechanism to detect and block Flash based advertisement containing these exploits as well as yet to be developed exploits.

Definitions

The following definitions are given by way of example and are not intended to be construed as limiting. A person of skill in the art may understand some of the terms defined below to include additional meaning when read in the context of this specification.

Executable Application—For the purposes of the following specification, an executable application can include any complied binary application (e.g., executable application or dynamical link libraries in a Microsoft Windows® environment), browser plug-in applications, browser or application scripts (e.g., Javascript™ or Visual Basic® script), operating system control scripts (e.g., bat files in a Microsoft Windows® environment or C-shell scripts in a Unix environment), and run-time interpreted code or applets (e.g., Java™ applets, Visual Basic® Controls, .Net™ code). Executable applications can encompass multiple individual processing units, such as processes, threads, and fibers. Additionally, some large executable applications may utilize dynamic link libraries (DLLs), scripts, or plug-in components to extend or enhance basic functionality. Within the following specification, an executable application may be referred to variously as a process, an application, an executable, or simply as software.

Sandbox Execution Environment (Sandbox Environment)—For the purposes of the following specification, a sandbox execution environment can be a segmented portion of a host computing device that shields an executable application from directly accessing certain resources or devices that may be available within a standard execution environment. A sandbox execution environment can be configured to provide various levels of restriction of the operations attempted by an executable application. Throughout this specification a sandbox execution environment may also be referred to as a sandbox environment or a sandboxed environment; no change in the general meaning of the term is intended by any variation in usage. In certain examples, the sandbox environment may be implemented within a separate computing device. For example, a client system may send a piece of code to a central server for sandboxed execution. In some examples, when a client system detects Flash content within a requested web page, the Flash content may be sent to a central server for sandbox execution prior to execution on the client system.

ActionScript—ActionScript is a computer scripting language primarily used in association with the Adobe® Flash® Player platform. Within the Adobe Flash platform, ActionScript takes the form of an SWF file embedded into a web page. Originally developed by Macromedia, the language is now owned by Adobe Systems, Inc. (which acquired Macromedia in 2005). ActionScript was initially designed for controlling simple 2D vector animations made in the Adobe® Flash® platform (formerly Macromedia Flash). Recent versions added functionality allowing for the creation of Web-based games and rich Internet applications with streaming media (such as video and audio). The more recent versions of ActionScript can be used to create interactive web-based advertisements and have enabled cyber-criminals a greater ability to embed malicious code within a Flash ad or application.

Exploit—An exploit (derived from the French language, meaning "achievement", or "accomplishment") is a piece of software, a chunk of data, or sequence of commands that take advantage of a bug, glitch, or vulnerability in order to cause unintended or unanticipated behavior to occur on computer software, hardware, or other electronic device (usually computerized). Exploits frequently include such things as gaining control of a computer system or allowing a denial-of-service attack.

Example Systems

FIG. 1 is a block diagram that depicts an example system 100 for detecting potential malicious mobile code in order to enhance Internet security. The system 100 represents an example approach to limiting the downloading of adware, spyware and malicious mobile code. In system 100, one or more client computers 102 are connected through a local area network 104 to a gateway 106, and through gateway 106 to Internet 108. Client computers 102 communicate with servers 110 through Internet 108.

In the example shown, one or more servers 110 contain malicious program code, such as Adware, spyware or malware. A server that contains, or is addressed by, malicious program code will be termed a "malicious" server.

In one embodiment, system 100 limits the downloading of adware, spyware and malicious mobile code by installing a gateway 106 at the network perimeter, and directing all web traffic (HTTP(S), FTP, SMTP, and other protocols) from the client computers 102 (including desktop computers/workstations and servers, such as E-mail servers for example) to gateway 106. That is, all client computers 102 are to be served solely by this gateway 106. In one embodiment, each gateway 106 includes a cluster of several gateway instances.

In the example depicted in FIG. 1, gateway 106 includes an anti-malware filter 112, a URL filter database 116, and a malware detector 114 connected to the anti-malware filter 112 and the URL filter database 116. The malware detector 114 performs behavioral analysis on the program file to identify URLs, categorizes the URLs as a function of the URL filter database 116, and assigns a malware probability based on the URL categories. The anti-malware filter 112 decides, based on the malware probability, how to dispose of the program file.

In one example, downloaded program code is reviewed. In one example, a list is created of the URLs that the program code will access at run-time (e.g. after installation on a client computer 102) and the URLs that the program code will monitor at run-time. Gateway 106 then looks up these URLs in its URL filter database and classifies or blocks the download of the program code according to the categories of the URLs embedded in it.

In one example, gateway 106 scans the downloaded mobile code and determines the URLs that may be accessed by or monitored by the mobile code later or at run-time. It then classifies the downloaded mobile code according to categories assigned to the discovered URL(s) and assigns a malware probability based on the category of that URL. If two or more URLs are found, a malware probability is calculated as a function of the malware probability of each URL.

In one example, no list of URLs is created. Instead, whenever a URL is found during a scan of the program code, it is checked in the URL filter database and a malware probability assigned based on the category of that URL. Scanning then continues until no more URLs are found. Again, if two or more URLs are found, a malware probability is calculated as a function of the malware probability of each URL.

In certain examples of the system 100, the discovered URLs can be checked against an online (centralized) URL database (not shown in FIG. 1). In some examples, the online URL database can be an online reputation system, such as TrustedSource™ Internet reputation system (from McAfee®, Santa Clara Calif.).

Figure 2:
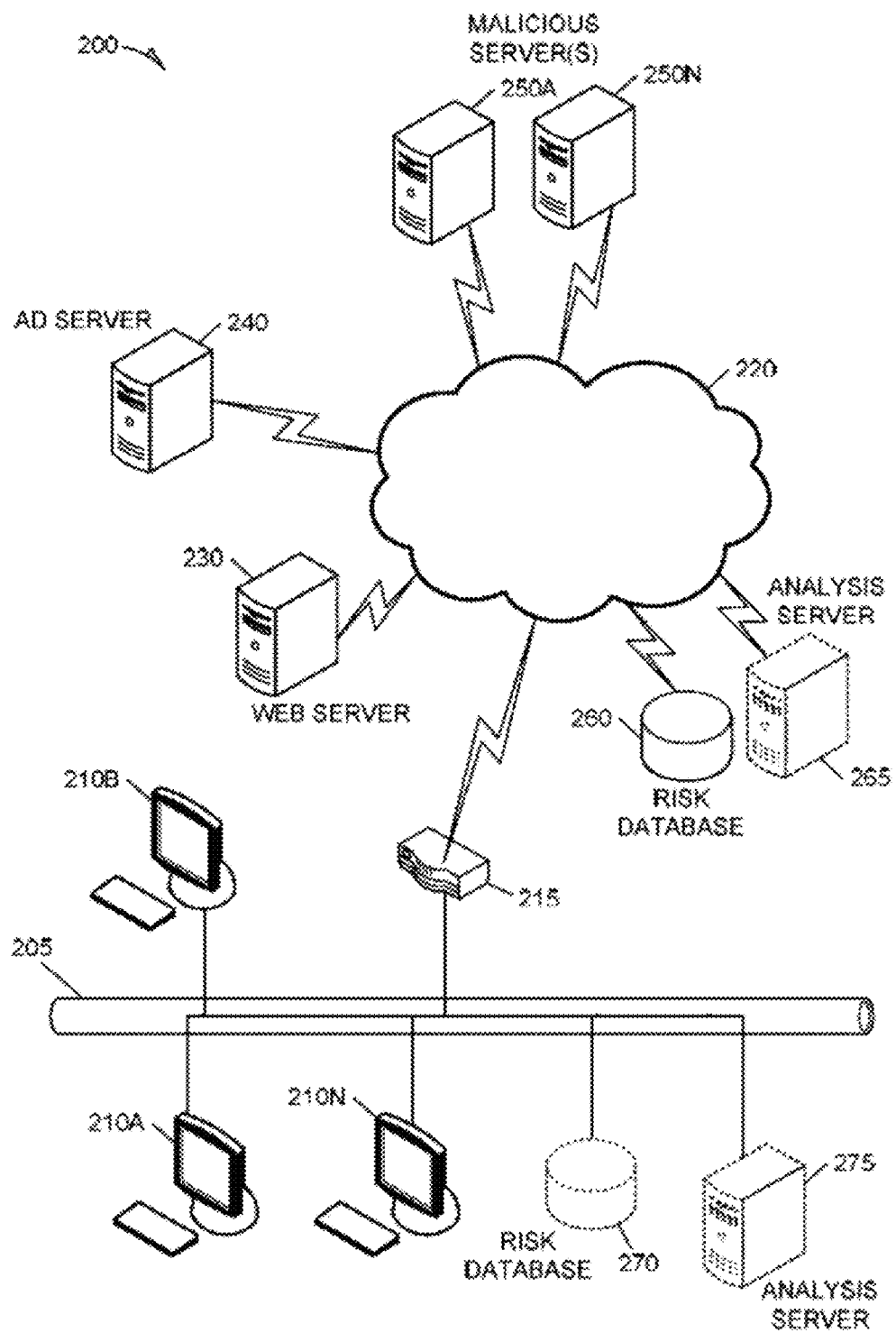
FIG. 2 is a block diagram depicting an example system configured to risk rate and pro-actively filter malicious online advertisements.

FIG. 2 is a block diagram depicting an example system 200 configured to risk rate and pro-actively filter malicious online advertisements. The system 200 includes a network 205, client systems 210A, 210B, . . . 210N (hereinafter collectively referred to as "client system 210" or "client systems 210"), gateway 215, wide-area network 220 (may also be referred to as Internet 220), web server 230, ad server 240, malicious servers 250A . . . 250N (hereinafter collectively referred to as "malicious server 250"), and risk database 260. In certain examples, the system 200 may also include analysis server 265, a local risk database 270, and a local analysis server 275.

The client systems 210 can be any network communication capable device, such as a personal computer, handheld device, or application server. Commonly, the client systems 210 are personal computers running a Windows®, Mac OS®, or Linux® operating system and connecting to the Internet with a web browser, such as Internet Explorer™ (from Microsoft, of Redmond, Wash.). In some examples, client systems 210 can be running web-based applications to connect to the Internet 220 download content, which can include Flash ads.

In the example depicted in FIG. 2, client systems 210 connect to the Internet 220 through gateway 215. In an example, client systems 210 can request web pages form the web server 230. Web pages served by the web server 230 can contain Flash advertisements served by the ad server 240. In some examples, the web pages served by the web server 230 may contain Flash ads from the ad server that contain redirection URLs pointed at one of the malicious server 250. Thus, in some examples, the ad server 240 can serve Flash ads that contain malicious content through the web server 230. In these examples, both the ad server 240 and the web server 230 may be unaware of the potentially malicious Flash ads being delivered to the client systems 210.

Flash has traditionally been considered a "safe" file format. Thus, most gateways, such as gateway 215, are configured to allow Flash content to pass unfiltered directly to client systems, such as client systems 210. Additionally, the format of Flash files allows malicious content to be obfuscated, such as by embedding redirection URLs within ActionScript code, making the use of traditional gateway detection mechanisms challenging.

In an example, the system 200 includes the online risk database 260, which can provide risk rating for URLs discovered within a Flash advertisement as well as risk ratings for Flash files as a whole. The risk database 260 can be a commercially available reputation database, such as Trusted-Source™ Internet reputation system (from McAfee®, Santa Clara Calif.). Alternatively, the online risk database 260 can be a proprietary database with the content developed over time through methods of risk rating Flash files and embedded URLs discussed below. In certain examples, the system 200 can also include a local risk database 270 that serves a similar purpose and may exchange data with the online risk database 260.

In certain examples, the system 200 includes one or more of the analysis servers 265, 275. The analysis servers 265, 275 can be used to analyze the potential risk of allowing any individual Flash advertisement to run on one of the client systems 210. Additional discussion of the structure of the analysis servers 265, 275 is provided below in reference to FIG. 4.

Figure 3:
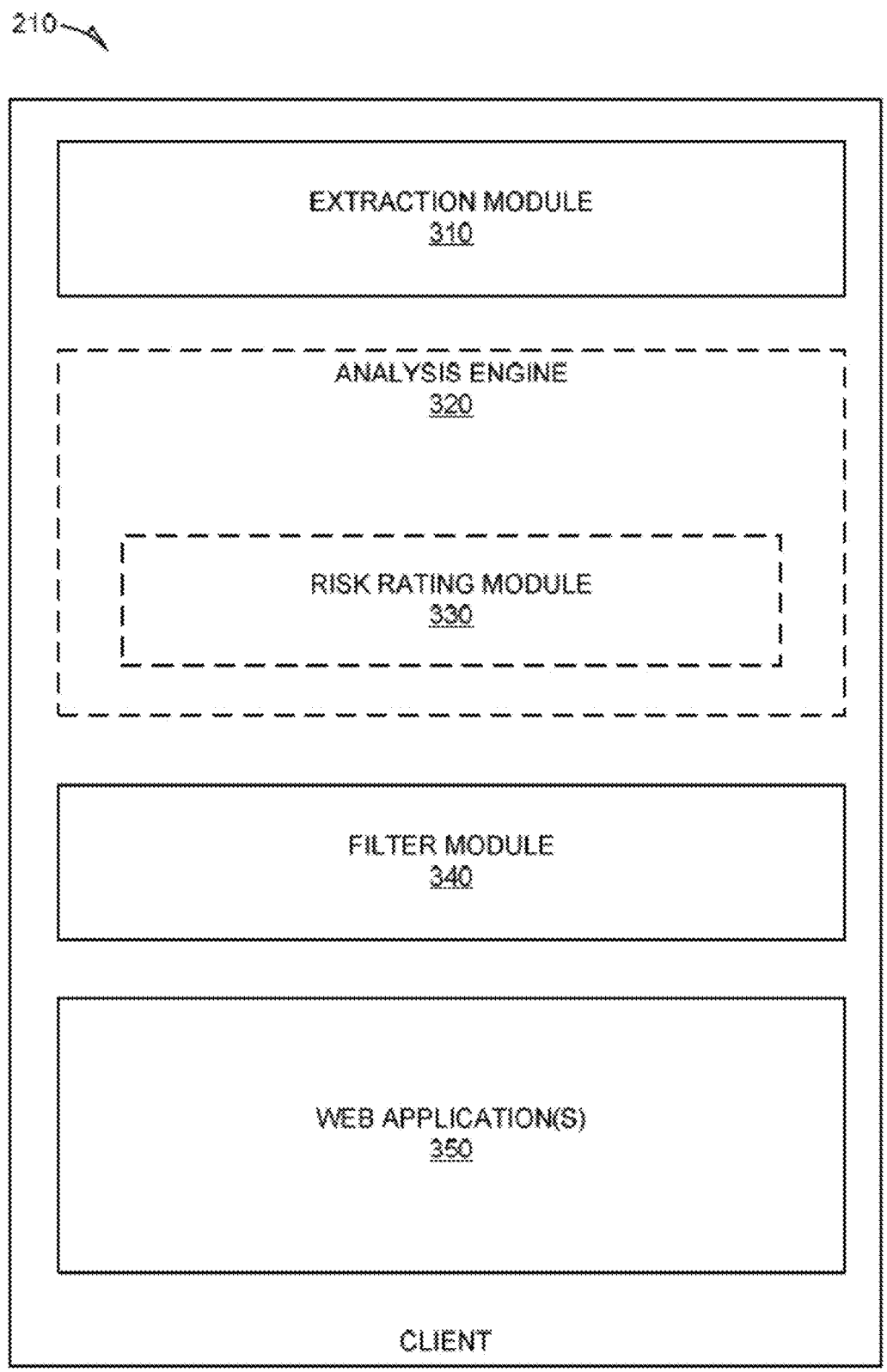
FIG. 3 is a block diagram depicting an example client-side system configured to risk rate and pro-actively filter malicious online advertisements.

FIG. 3 is a block diagram depicting an example client system 210 configured to risk rate and pro-actively filter malicious online advertisements. In an example, the client system 210 for risk rating and pro-actively filtering malicious online advertisements includes an extraction module 310, a filter module 340, and one or more web applications 350. In certain examples, the client system 210 also includes an analysis engine 320, which can optionally include a risk rating module 330.

In an example, the extraction module 310 can be used to extract Flash ads embedded within standard web pages (or otherwise delivered over the Internet 220 of FIG. 2 to the client system 210). In certain examples, the extraction module 310 detects Flash files (also referred to as a SWF or SWF file) or embedded links out to Flash files within web pages or other kinds of web downloadable content. The extraction module 310 can be configured to strip the SWF file to the reference to the SWF file prior to the web page being rendered by one of the web applications 350, such as a browser. In some examples, the extraction module will replace the SWF file or reference with a static image or HTML (hypertext mark-up language) indicating to a user that the Flash content is being inspected (or blocked) for security purposes. If the Flash content is found to be safe, the extraction module 310 can re-insert the Flash content back into the web page and allow it to be rendered by the browser (or another one of the web applications 350).

In one example, the filter module 340 is configured to block Flash ads (SWF files) determined to be potentially malicious.

The filter module 340 receives information from an analysis engine, such as analysis engine 320, which determines whether a given Flash ad contains potentially malicious content (or can cause redirection to potentially malicious URLs). In examples where the Flash ad is determined to be potentially malicious, the filter module 340 can be configured to send static content, such as an image file or HTML, to warn the user of the blocked content. In certain examples, the filter module 340 can also send information, such as the risk rating to one of the web applications 350, to display within the downloaded content (e.g., web page).

In some examples, the analysis engine is located within the client system 210, such as analysis engine 320. In other examples, the analysis engine can be located on a remote analysis server, such as analysis server 265, 275 both of FIG. 2. In certain examples, the analysis engine can include a risk rating module, such as risk rating module 330. The risk rating module 330 can be configured to generate a risk rating based on information derived from the Flash ad (SWF file) by the analysis engine 320. In certain examples, the risk rating module 330 can access a risk database, such as online risk database 260 of FIG. 2, to assisting in determining the risk rating for a particular Flash ad or redirection URL found within the SWF file. In one example, the risk rating module 330 can hash the SWF file and use the hash value to determine whether the SWF file has been previously reported as being malicious. In this example, the risk database 260 includes entries for specific SWF files indexed by hash value.

Figure 4:
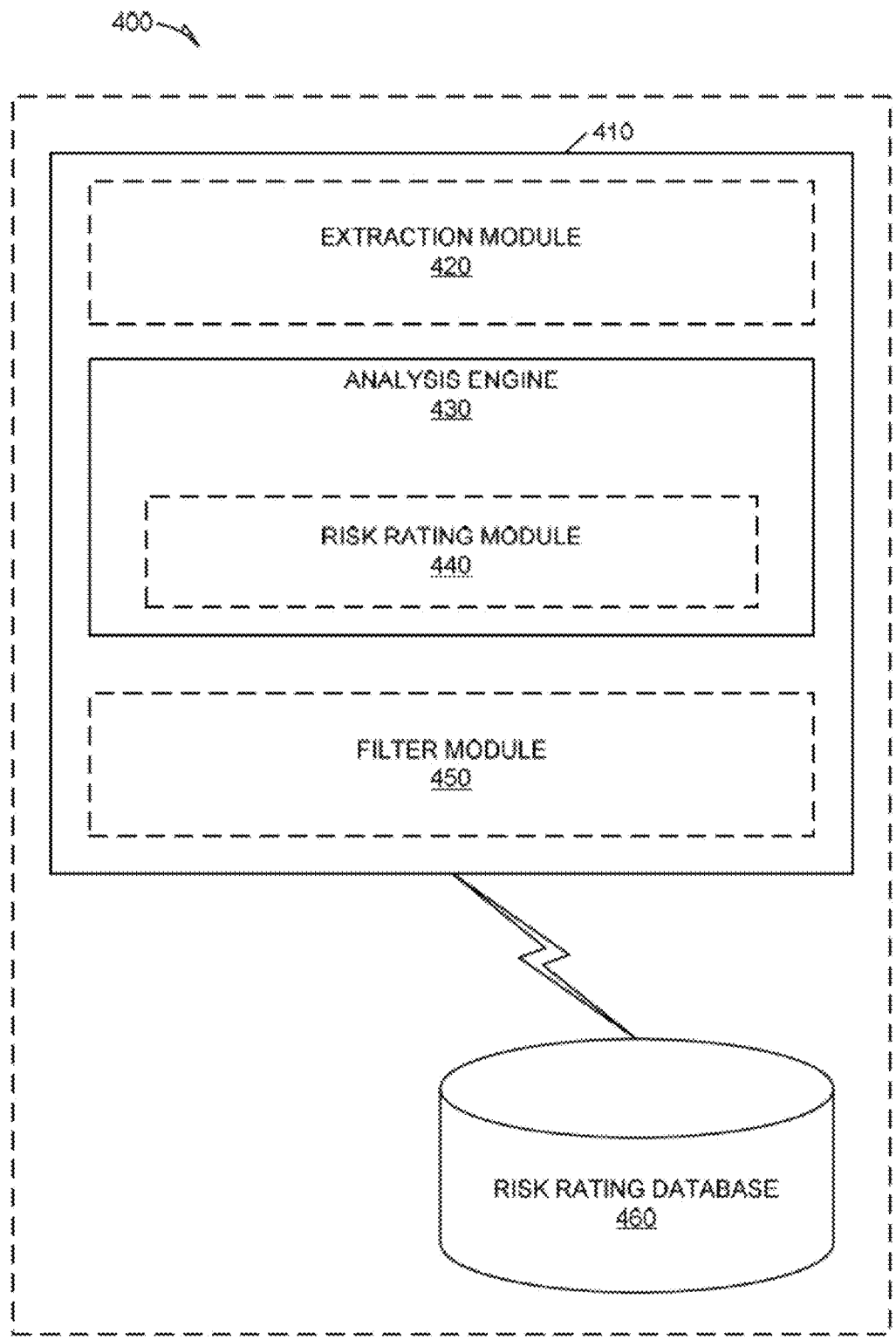
FIG. 4 is a block diagram depicting an example server-side system configured to risk rate and pro-actively filter malicious online advertisements.

FIG. 4 is a block diagram depicting an example server system 400 configured to risk rate and pro-actively filter malicious online advertisements. In an example, the server system 400 includes a server 410, an analysis engine 430, and a risk rating database 460. In some examples, the analysis engine 430 includes a risk rating module 440. In certain examples, the server 410 includes an extraction module 420 and a filter module 450. As noted above in reference to FIG. 3, certain example systems can locate extraction modules, analysis engines and filter modules in various locations between the client and server implementations. For example, a system can be configured where the client system 210 of FIG. 3 includes an extraction module 310 of FIG. 3, but the server 410 includes the analysis engine 430 and the filter module 450. The various functions of the extraction module 420, analysis engine 430, risk rating module 440, and filter module 450 are basically the same regardless of the physical implementation location. In an analysis server 265, 275, both of FIG. 2, implementation of the extraction module 420, the extraction module 420 can include components running on the gateway 215 of FIG. 2 or the client systems 210 to assist in identifying incoming content containing SWF files.

Further discussion of the functionality associated with each structural component discussed above is provided below in reference to FIGS. 5-8. The example methods will include references back to the structural components typically responsible for the execution of each operation.

Example Methods

The following examples illustrate how risk rating and pro-active monitoring and filtering can be used to protect client systems from malicious online advertisements.

Figure 5:
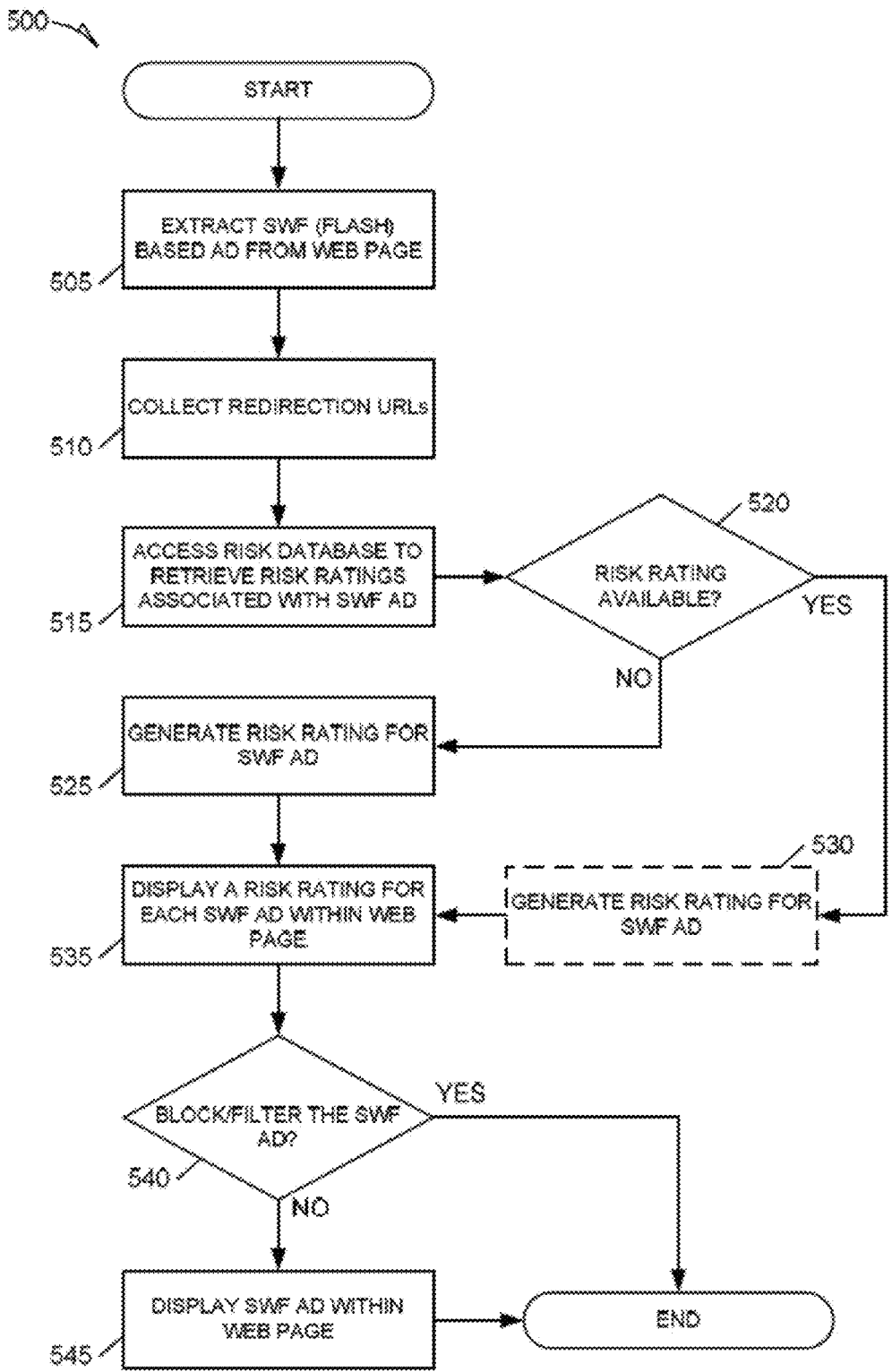
FIG. 5 is a flowchart depicting an example method for risk rating and pro-actively detecting online malicious advertisements.

FIG. 5 is a flowchart depicting an example method 500 for risk rating and pro-actively detecting online malicious advertisements. The method 500 includes operations for extracting SWF based ads from a web page at 505, collecting redirection URLs at 510, accessing risk database at 515, determining if a risk rating is available at 520, generating a risk rating for the SWF ad at 525, displaying a risk rating at 535, determining whether to block the SWF ad at 540, and displaying the SWF ad within a web page at 545. In certain examples, the method 500 also includes generating a risk rating for the SWF ad at 530.

In this example, the method 500 begins at 505 with the extraction module 310 of FIG. 3 extracting any Flash based advertisements (or any SWF based content) from a web page requested by a client system 210 of FIG. 3. At 510, the method 500 continues with the analysis engine 320 of FIG. 3 scanning the SWF files, particularly any ActionScript functions, for embedded redirection URLs. In some examples, the analysis engine 320 scans the SWF content for redirection URLs specific to ActionScript tags.

The method 500 continues at 515 with the analysis engine 320 accessing a risk database, such as risk database 260 of FIG. 2, to retrieve risk ratings for the redirection URLs discovered within operation 510. In some examples, accessing the risk database 260 is performed by a risk rating module 330 within the analysis engine 320. At 520, the method 500 continues with the analysis engine determining whether a risk rating is available for each of the redirection URLs located within the Flash content extracted from the web page. In certain examples, the method 500 continues at 530 if risk ratings are available within a risk database (260, 270 of FIG. 2) for the redirection URLs. At 530, the analysis engine 320 uses the risk ratings from the risk database to generate a risk rating for the SWF content.

Returning to 520, if risk ratings are unavailable for any of the located redirection URLs, the method 500 continues at 525 with the analysis engine 320 generating a risk rating for the SWF content. Generating a risk rating can include additional inspection of the SWF file as well as determining whether any of the redirection URLs point to potentially malicious web sites. One method of checking redirection URLs includes programmatically entering the URLs into a web browser operating within a secured environment (execution sandbox). The execution sandbox environment can be closely monitored to determine if any potentially malicious downloads or other suspicious behaviour occurs due to browsing any of the redirection URLs. The analysis engine 320 can also scan for malformed ActionScript tags, the presence of shellcode, or the presence of malicious ActionScripts. Once a risk rating is generated for the SWF content at operation 525 or operation 530, the method 500 continues at 535.

At 535, the analysis engine 320 sends the generated risk rating to one of the web applications 350 of FIG. 3, such as a browser, for display. One example, the risk rating for the SWF content is displayed within a web page near or in place of the SWF content. Displaying the risk rating provides a user with some indication of the level of risk involved in visiting certain sites or in obtaining content from unknown locations.

At 540, the method 500 continues with the filter module 340 of FIG. 3 determining whether the SWF content (e.g., advertisement) should be blocked. If the filter module 340 blocks the SWF content, the method 500 can conclude with the filter module 340 providing at least one of the web applications 350 some static content to indicate to the user that the Flash content was blocked. If the filter module 340 does not block the SWF content, the method 500 concludes at 545 with at least one of the web applications 350 displaying the SWF content to the user. In some examples, one of the web applications 350 continues to display the risk rating associated with the Flash content even after it has been determined to be safe enough to allow.

Figure 6:
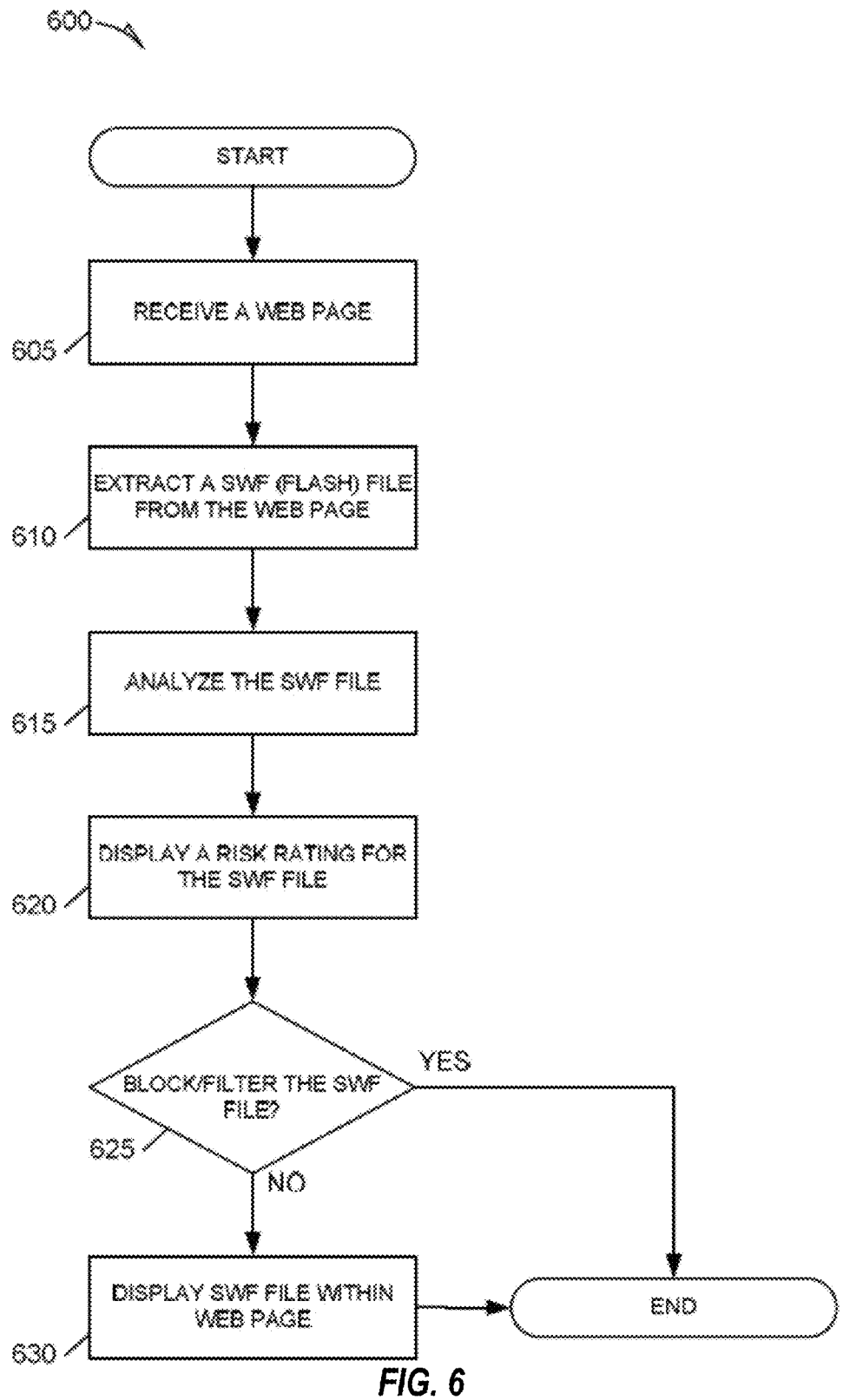
FIG. 6 is a flowchart depicting an example method for risk rating and pro-actively blocking online malicious advertisements.

FIG. 6 is a flowchart depicting an example method 600 for risk rating and pro-actively blocking online malicious advertisements. The method 600 is a streamlined method for risk rating and pro-actively blocking online malicious advertisements. In this example, the method 600 includes operations for receiving a web page (or any web-based content) at 605, extracting a SWF file from the web page at 610, analyzing the SWF file at 615, displaying a risk rating for the SWF file at 620, deciding whether to block the SWF file at 625, and displaying the SWF file within the downloaded web page at 630.

The method 600 begins at 605 with the client system 210 of FIG. 3 receiving a web page or similar web content that contains at least one SWF file. In certain examples, the web page or web content is received at a gateway, such as gateway 215 of FIG. 2. In certain other examples, the web page or web content can be received by the analysis server 275 of FIG. 2. At 610, the method 600 continues with the extraction module 310 of FIG. 3 extracting a SWF file from the web page received by the client system 210. In certain examples where the web page was received by one of the servers (e.g., analysis server 275 or gateway 215), the extraction module 420 of FIG. 4 extracts the SWF file from the web page.

In an example, the method 600 continues at 615 with the analysis engine 320 of FIG. 3 analyzing the SWF file. The analysis can include locating URL redirection specific to ActionScript tags, scanning for malformed tags, detecting the presence of shellcode within the SWF file, or detecting the presence of malicious ActionScripts within the SWF file, among other things. In an example, the analysis also includes decompressing the SWF file prior to further analysis of the code. In an example, the analysis engine 320 determines a risk rating for the SWF file based on analysis of the potential for malicious behaviour. In some examples, the risk rating is also influenced by analyzing the redirection URLs (and associated hosts) for potentially malicious behaviour.

At 620, the method 600 continues with one of the web applications 350 of FIG. 3 displaying a risk rating for the SWF file. For example, if the SWF file was extracted from a web page, a browser running on the client system 210 can display the risk rating information in place of the SWF file or within close proximity to where the SWF file is displayed. At 625, the method 600 continues with the filter module 340 determining whether to block the SWF file or allow the SWF file to be processed (and displayed) by one of the web applications 350 that requested the SWF file. If the SWF file is determined to be safe, then the method 600 concludes at 630 with the SWF file being displayed within a web page or downloaded content that contained the SWF file. If the SWF file is determined to be potentially malicious, the SWF file is blocked at 625. In some examples, if the SWF file is blocked, the requesting web application of the web applications 350 can be instructed to display a warning or other message to inform the user of the potentially malicious content.

Figure 7:
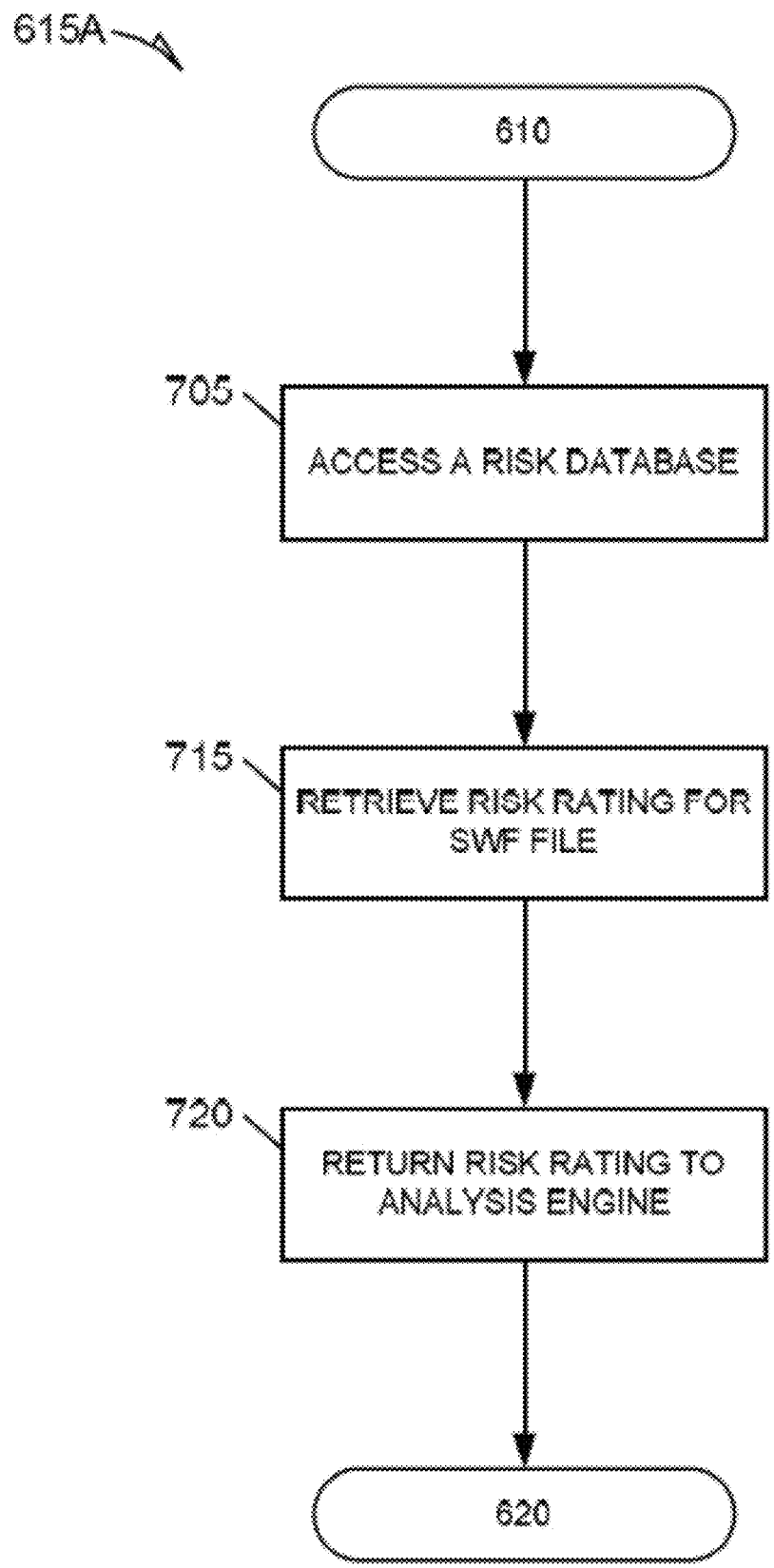
FIG. 7 is a flowchart depicting an example optional operation for analyzing and risk rating potentially malicious online advertisements.

FIG. 7 is a flowchart depicting an example optional operation for analyzing and risk rating potentially malicious online advertisements. Optionally, the operation 615 described in FIG. 6 can include a method 615A with operations for accessing a risk database at 705, retrieving risk rating for the SWF file at 715, and returning a risk rating to a analysis engine at 720. In an example, the method 615A begins at 705 with the analysis engine 320 of FIG. 3 accessing a risk database, such as risk database 260 of FIG. 2, to obtain risk rating formation about the SWF file. The risk rating information can include risk ratings on individual redirection URLs located within the SWF file or can be risk rating information associated with the SWF file as a whole. At 715, the risk rating information located for the SWF file or individual URLs is retrieved from the risk database 260. At 720, the method 615A concludes with the risk rating information being returned to the analysis engine 320.

Figure 8:
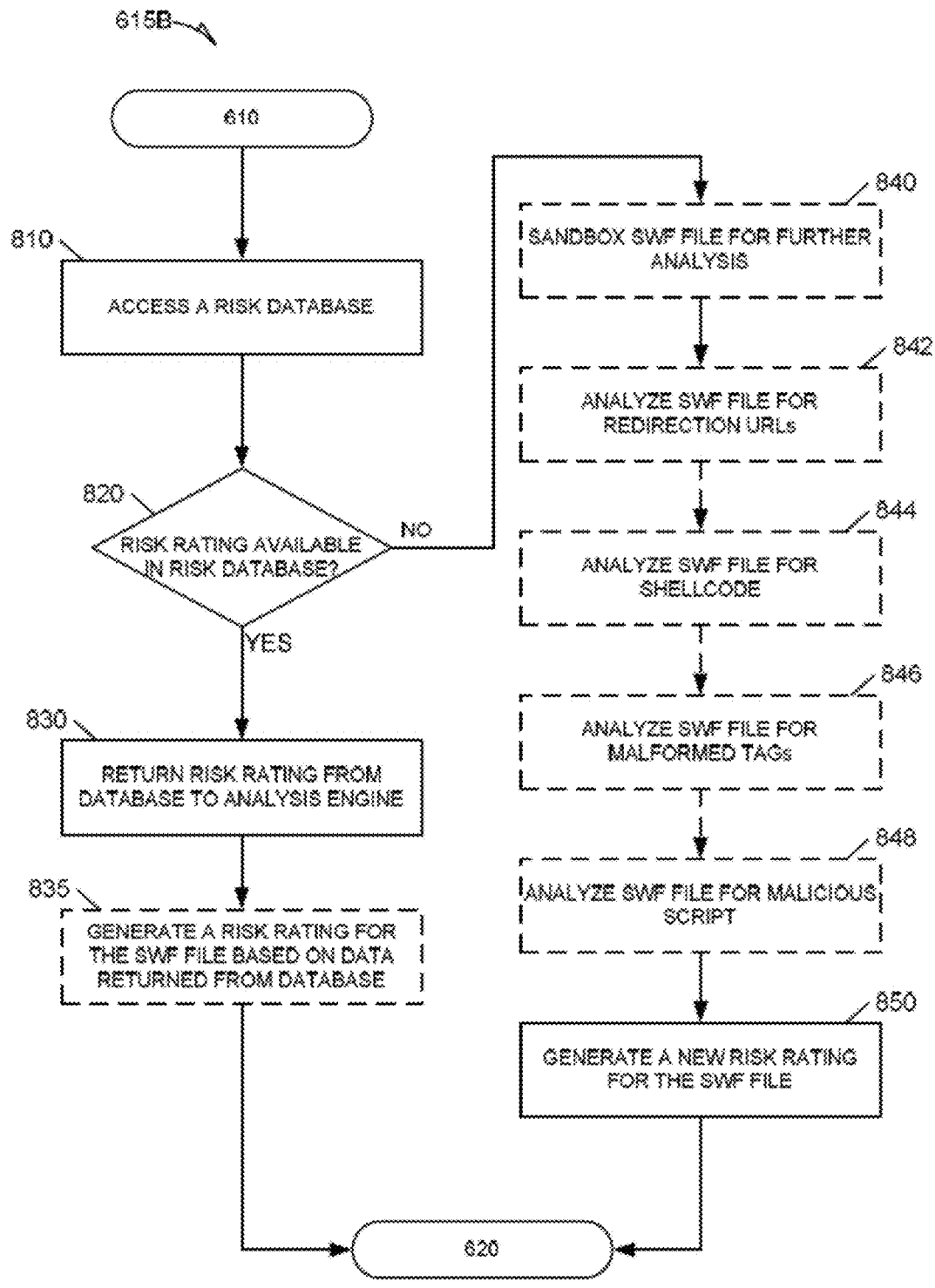
FIG. 8 is a flowchart depicting an example method of analyzing and generating a risk rating for potentially malicious online advertisements.

FIG. 8 is a flowchart depicting an example method 615B of analyzing and generating a risk rating for potentially malicious online advertisements. In another example, operation 615 described in FIG. 6 can encompass a method 615B, including operations for accessing a risk database at 810, determining if a risk rating is available at 820, returning a risk rating from the database at 830, and generating a new risk rating for the SWF file at 850. In certain examples, the method 615B optionally includes operations for sandboxing the SWF file for further analysis at 840, analyzing the SWF file for redirection URLs at 842, analyzing the SWF file for shellcode at 844, analyzing the SWF file for malformed tags at 846, and analyzing the SWF file for malicious script at 848. In some examples, the method 615B can also include an operation for generating a risk rating for the SWF file based on data returned from the database at 835.

In an example, the method 615B begins at 810 with the analysis engine 320 of FIG. 3 accessing a risk database, such as risk database 270 of FIG. 2. The analysis engine 320 can be accessing the risk database 270 to determine risk ratings for one or more redirection URLs located within the SWF file or to determine a risk rating for the SWF file itself. At 820, the method 615B continues with the analysis engine 320 determining whether a risk rating is available within the risk database 270. If the risk ratings sought by the analysis engine 320 are available within the risk database 270, then the method 615B continues at 830 with the risk database 270 returning the requested risk ratings to the analysis engine 320. In this example, the method 615B can continue with the analysis engine 320 generating a risk rating for the SWF file based on data returned from the database, such as individual risk ratings for the redirection URLs found within the SWF file. The analysis engine can also update the risk database 270 with the risk rating generated for the SWF file at 835.

Returning to 820, if the risk database 270 (or in some examples, risk database 260 of FIG. 2) does not include the risk ratings for the SWF file, the method 615B can continue with the analysis engine 320 generating a new risk rating for the SWF file. Generation of a new risk rating can include any combination of the operations (840, 842, 844, 846, and 848) illustrated in FIG. 8. The analysis engine 320 of FIG. 3 can also be configured to add additional analysis methods as they are discovered for determining potentially malicious behavior of a Flash advertisement.

At 840, the method 615B can continue with the analysis engine 320 sandboxing the SWF file for further analysis. Sandboxing can include running the SWF file in a segregated execution environment within the client system 210 of FIG. 3. In certain examples, sandboxing includes transferring the SWF file to an analysis server, such as analysis server 275 of FIG. 2, for operation within a sandbox environment hosted by the analysis server 275. Operation of the SWF file within a sandbox environment allows for close monitoring of the SWF File without exposing the client system 210 to unnecessary risk. Any of the following operations (842, 844, 846, and 848) can be done within the sandbox environment as well.

At 842, the method 615B can continue with the analysis engine 320 analyzing the SWF file for redirection URLs. In one example, redirection URLs associated with action tags are of particular interest for potentially malicious behavior. As described above, the redirection URLs can be checked against an online trust database as part of the analysis.

Figure 9:
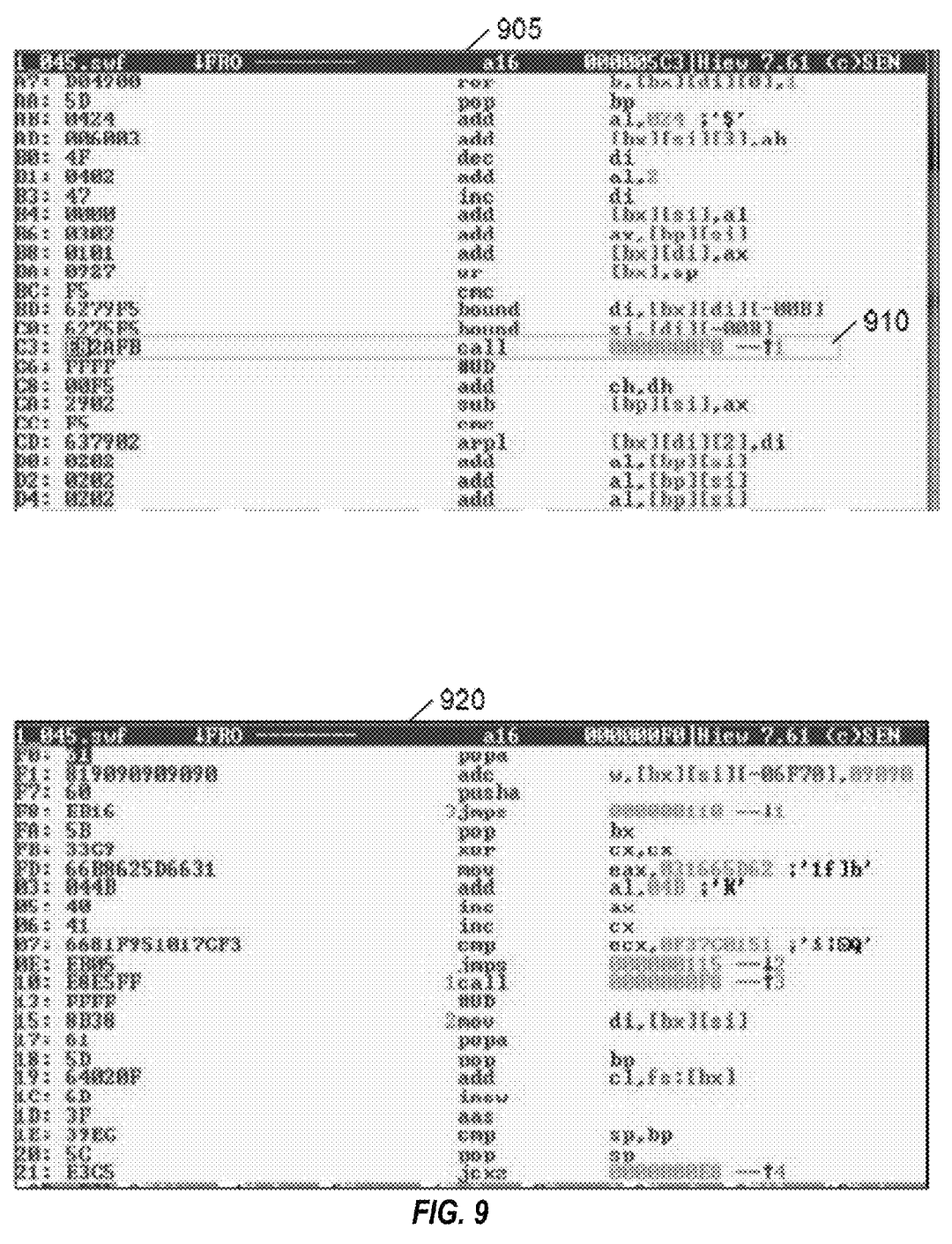

At 844, the method 615B can continue with the analysis engine 320 analyzing the SWF file for the presence of shellcode. In an example, scanning for shellcode can include scanning for a "jump" outside certain established boundaries within ActionScript. FIG. 9 depicts some example Action- Script code (905, 920) from a SWF file. Scanning for shellcode can include traversing a section of an uncompressed SWF file (e.g., the ActionScript code 905) reviewing ActionScript tags (the example ActionScript depicted in FIG. 9 is ActionsScript version 3). In this example, the ActionScript tags are located within a doABC section. Line 910 illustrates a potential jump outside the doABC boundaries. Shellcode may be located by following the jump, see ActionScript 920. In another example, scanning for the presence of shellcode can include decompressing the SWF file and looking for specific shellcode patterns within the code that have been determined to be potentially malicious. Table 1 illustrates codes are examples that have been determined to be potentially malicious:

TABLE 1

Shellcode Patterns

Figure 10:
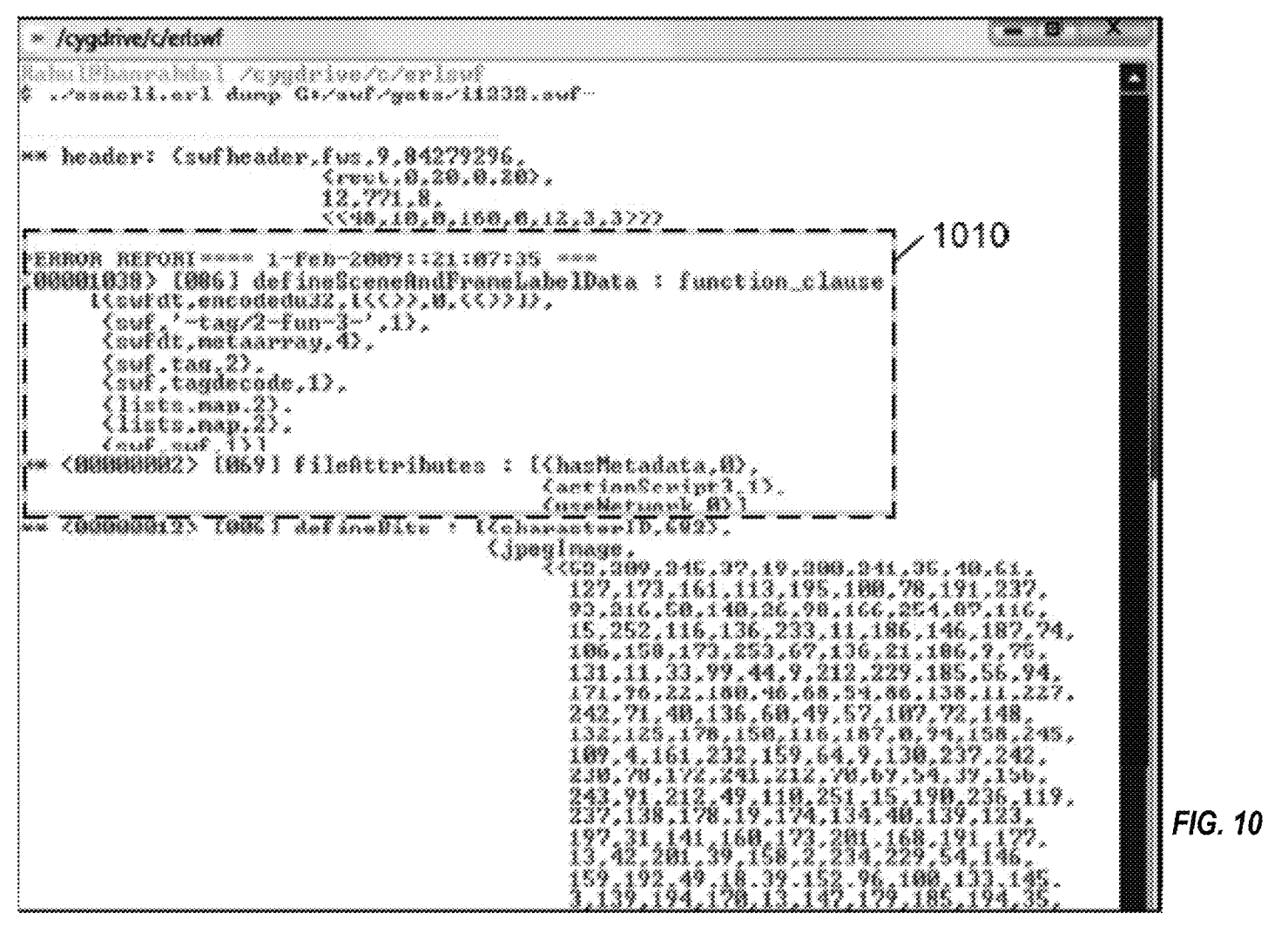

CALL NEXT
NEXT: POP reg
JMP [0xEB] 1ST
2ND: POP reg
1ST: CALL 2ND
JMP [0Xe9] 1ST
2ND: POP reg
1ST: CALL 2ND
FLDZ
FSTENV [esp-0ch]
POP reg At 846, the method 615B can continue with the analysis engine 320 analyzing the SWF file for malformed tags, typically ActionScript tags. In an example, malformed tags are identified by comparing the SWF specification to the actual tags within the SWF file and locating abnormalities. FIG. 10 is a section of a SWF file illustrating a malformed tag. Box 1010 highlights an example of a malformed defineSceneAndFrameLabelData tag within a section of a SWF file.

Figure 11:
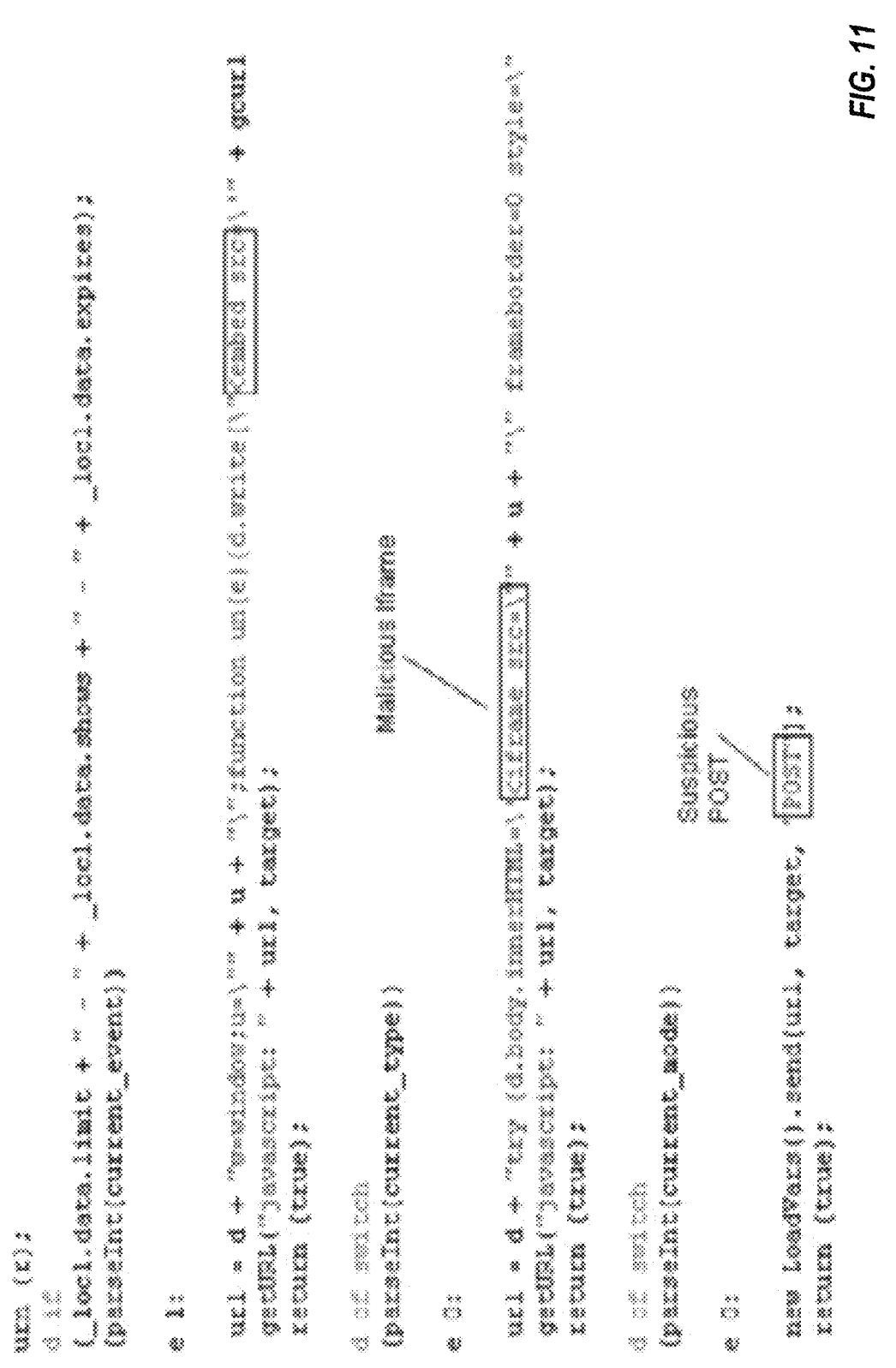

At 848, the method 615B can continue with the analysis engine 320 analyzing the SWF file for malicious scripts. FIG. 11 is a code listing including examples of malicious scripts from a SWF file. In an example, the analysis engine 320 of FIG. 3 scans the SWF file for suspicious HTML ActionScript methods, such as POST or iframe. The analysis engine 320 can also scan for suspicious redirections to malicious web sites in this operation.

Modules, Components and Logic

Certain embodiments are described herein as including logic or a number of components, modules, engines, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS (Software as a Service). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
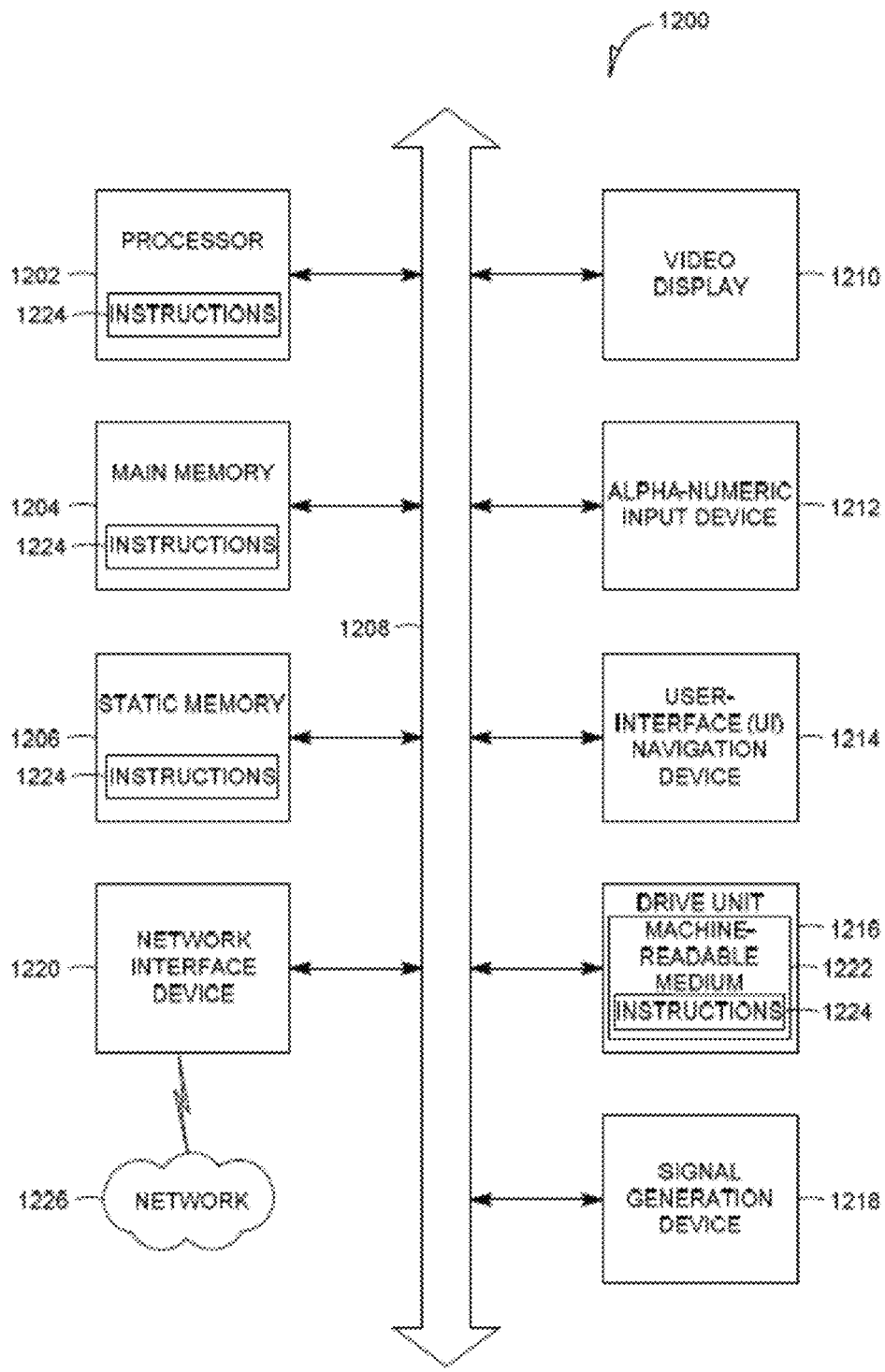
FIG. 12 is a block diagram of a machine in the example form of a computer system within which instructions for causing the machine to perform any one or more of the methodologies discussed herein may be executed.

FIG. 12 is a block diagram of a machine in the example form of a computer system 1200 within which instructions for causing the machine to perform any one or more of the methodologies discussed herein may be executed. As such, the computer system 1200, in one embodiment, comprises the system 1200. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more data structures and instructions 1224. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, if used the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory machine readable medium on which are stored instructions, comprising instructions that when executed cause a programmable device to:
   receive a web page including a SWF (small web format) file dynamically included in the web page as the web page is provided to the programmable device;
   locate an embedded redirection URL (uniform resource locator) contained within the SWF file;
   obtain a risk rating for the embedded redirection URL from a risk database if the risk rating for the embedded redirection URL is available in the risk database;
   generate the risk rating for the embedded redirection URL when the risk rating for the embedded redirection URL was not obtained from the risk database; and
   generate a risk rating for the SWF file based at least in part on the risk rating for the embedded redirection URL.

2. The machine readable medium of claim 1, wherein the instructions that when executed cause the programmable device to generate a risk rating for the SWF file comprise instructions that when executed cause the programmable device to:
   analyze the behavior of the SWF file within a segregated execution sandbox.

3. The machine readable medium of claim 2, wherein the instructions that when executed cause the programmable device to analyze the behavior of the SWF file comprise instructions that when executed cause the programmable device to:
   process the embedded URL within the segregated execution sandbox; and
   evaluate the results of following the embedded redirection URL.

4. The machine readable medium of claim 2, wherein the instructions that when executed cause the programmable device to analyze the behavior of the SWF file comprise instructions that when executed cause the programmable device to:
   scan for shellcode within the SWF file.

5. The machine readable medium of claim 2, wherein the instructions that when executed cause the programmable device to analyze the behavior of the SWF file comprise instructions that when executed cause the programmable device to:
   scan for a malformed tag.

6. The machine readable medium of claim 2, wherein the instructions that when executed cause the programmable device to analyze the behavior of the SWF file comprise instructions that when executed cause the programmable device to:

scan for a malicious script within the SWF file.

7. The machine readable medium of claim 1, wherein the instructions that when executed cause the programmable device to generate a risk rating for the SWF file comprise instructions that when executed cause the programmable device to:

scan action tags.

8. The machine readable medium of claim 1, wherein the instructions that when executed cause the programmable device to generate a risk rating for the SWF file comprise instructions that when executed cause the programmable device to:

generate a new risk rating for the SWF file based on at least one of:
 the embedded redirection URL contained within the SWF file;
 shellcode within the SWF file;
 a malformed tag within the SWF file; or
 a malicious script within the SWF file.

9. The machine readable medium of claim 8, wherein the instructions further comprise instructions that when executed cause the programmable device to:

update the risk database with the generated risk rating for the embedded redirection URL and the new risk rating for the SWF file.

10. The machine readable medium of claim 1, wherein the web page contains a link to the SWF file.

11. The machine readable medium of claim 1, wherein the SWF file is embedded into the web page.

12. A system comprising:
 an extraction module configured to extract an SWF (small web format) file from a web page received from a web server, the SWF file dynamically included in the web page as the web page is provided by the web server;
 an analysis engine communicatively coupled to the extraction module and configured to:
  locate an embedded redirection URL (uniform resource locator) contained within the SWF file;
  obtain a risk rating for the embedded redirection URL from a risk database if the risk rating for the embedded redirection URL is available in the risk database;
  generate the risk rating for the embedded redirection URL when the risk rating for the embedded redirection URL was not obtained from the risk database; and
  generate a risk rating for the SWF file based at least in part on the risk rating for the embedded redirection URL; and
 a filter module configured to determine, based on the risk rating for the SWF file, whether to filter the SWF file and whether to send an alert to a browser for display within the web page.

13. The system of claim 12, wherein the analysis engine is further configured to analyze the behavior of the SWF file within a segregated execution sandbox.

14. The system of claim 13, wherein the analysis engine is configured to analyze the behavior of the SWF file within a segregated execution sandbox by being configured to:

process the embedded redirection URL within the segregated execution sandbox; and
evaluate the results of following the embedded redirection URL.

15. The system of claim 13, wherein the analysis engine is further configured to scan the SWF file for shellcode.

16. The system of claim 13, wherein the analysis engine is further configured to scan the SWF file for malformed tags.

17. The system of claim 13, wherein the analysis engine is further configured to scan the SWF file for malicious scripts.

18. The system of claim 12, wherein the analysis engine is further configured to scan the SWF file for action tags representing potentially suspect functions.

19. The system of claim 12, wherein the analysis engine comprises:
 a risk rating module configured to generate the risk rating of the SWF file based on at least one of:
  the embedded redirection URL contained within the SWF file;
  a segment of shellcode within the SWF file;
  a malformed tag within the SWF file; or
  a malicious script within the SWF file.

20. The system of claim 19, wherein the risk rating module is communicatively coupled to the risk database, and the risk rating module is configured to update the risk database with the generated risk rating for the SWF file.

21. A computer-implemented method of generating a risk rating for a SWF (small web format) file, comprising:
 extracting an SWF (small web format) file from a web page by a programmable device, the SWF file dynamically included in the web page as the web page is provided to the programmable device,
 locating an embedded redirection URL (uniform resource locator) contained within the SWF file;
 obtaining a risk rating for the embedded redirection URL from a risk database if the risk rating for the embedded redirection URL is available in the risk database;
 calculating the risk rating for the embedded redirection URL when the risk rating for the embedded redirection URL was not obtained from the risk database; and
 calculating a risk rating for the SWF file based at least in part on the risk rating for the embedded redirection URL.

22. The computer-implemented method of claim 21, wherein generating a risk rating for the SWF file comprises:
 analyzing the behavior of the SWF file within a segregated execution sandbox.

23. The computer-implemented method of claim 22, wherein analyzing the behavior of the SWF file comprises:
 processing the embedded URL within the segregated execution sandbox; and
 evaluating the results of following the embedded redirection URL.

24. The computer-implemented method of claim 22, wherein analyzing the behavior of the SWF file comprises:
 scanning for one of:
  shellcode within the SWF file;
  a malicious script; and
  a malformed tag.

25. The computer-implemented method of claim 22, further comprising:
 updating the risk database with the generated risk rating for the embedded redirection URL and the risk rating for the SWF file.

* * * * *